Patented May 3, 1932

1,856,366

UNITED STATES PATENT OFFICE

GERALD NOEL WHITE, OF EASTCHEAP, LONDON, ENGLAND

PRODUCTION OF COLORED EFFECTS IN CEMENTITIOUS AND BUILDING MATERIALS

No Drawing. Application filed February 9, 1927, Serial No. 167,074, and in Great Britain March 8, 1926.

This invention relates to the production of colored effects in building materials.

The object of the present invention is to provide a modified or improved method of obtaining such colored effects.

The invention in brief consists in a method for the production of colored effects in cementitious and building materials in accordance with which an anthraquinone vat dyestuff is incorporated with the building material.

The following examples illustrate how the invention may be carried into effect, all parts being parts by weight:—

Example 1

This deals with a method in which milling is employed.

5 lbs. of standard paste of Caledon brilliant purple RR are submitted to intensive milling for about one to six hours or such time as is necessary to convert the greater part of the dyestuffs into the form of a dispersion or solution. If it is preferred 6 pints of sodium silicate or any other substance or mixture of substances known to act as dispersion means may be added before or during milling. The milled paste is either stored for use or made up to 2½ gallons with water, preferably softened, and then used as the gauging water for sand and cement mixture containing 100 lbs. of cement.

Example 2

This deals with a method of producing a dispersion or solution in which oxidation of a leuco compound is employed. According to this example, 5 pounds of standard vat dyestuff paste are mixed with 2 to 2½ gallons of 5% caustic soda and warmed to about 40° C. Sodium hydrosulphite is then added in small quantities until a clear blue solution of the leuco compound is obtained. To this solution there is added 6 pints of sodium silicate of 140° Tw. followed by the addition of about 3 pints of 20% sodium carbonate solution or the like for the liberation of gelatinous silica. The mass is then to be stirred or otherwise exposed to the air, or aerated as by blowing air through it or forming a spray of the solution or dispersion by air under pressure to obtain substantially complete oxidation. The oxidized paste is if necessary freed from impurities and then diluted to 2 to 2½ gallons and used as above.

Example 3

This deals with a method of obtaining a dispersion or solution, particularly a modification of Example 2. According to this example, a dispersion or solution of the dyestuff prepared in accordance with Example 2 is permitted to oxidize prior to or during milling in a suitable device, such as for instance a mill.

General

The proportions in which the dyestuff preparation and building material are mixed can be varied to produce the desired depth of color.

Taken as a general rule the proportion given in the examples set out above yields strong tones.

If desired, the sand may be omitted using the cement slurry so obtained in the form of a wash. Cement of any kind containing a small proportion, e. g. 0.1 per cent., of impalpable aluminium powder is particularly suitable.

Where any of the above methods are used for dyeing a mixture of cement and sand or like aggregate, the depth of color obtained appears to vary with variations of the relative proportions of dyestuff and cement, and to be substantially unaffected by variations in the amount of aggregate used, which seems to show that the dyestuff has an affinity for and is fixed substantially only on cement. This is a point of great practical importance to the user, since it is not necessary accurately to determine either the amount of aggregate or of water used.

The invention is not limited to the detailed examples given or to the precise routine or like details.

Further, in place of a single coloring material, mixtures of two or more suitable coloring materials may be employed according to the effect desired.

In place of Caledon brilliant purple RR other Caledon or vat dyestuffs particularly fast to light may be employed, the quantities of paste being modified if desired to give the required color effect.

Where reference to a standard paste is made, this is not limited to a paste containing 10 per cent. of the actual dyestuff. The actual dry weight of the paste may be considerably in excess of 10 per cent. due to the presence of other substances.

In this specification and claims the term "building material" as used herein includes such substances as Portland or other cement, plaster, asbestos, lime and any other material suitable for use as building material, or mixtures of these.

The invention may be applied either to the loose building material, such for example as cement preferably while the same is being gauged or it may be applied by way of impregnation, painting or other external application to the finished article.

In this specification the term "vat dyestuffs" means anthraquinone vat dyestuffs or anthraquinone vat dyestuffs which are capable of being vatted and are adapted to dye cement or other building materials either in their vatted or unvatted condition and also includes colored vat dyestuff intermediates.

It also includes anthraquinone colors capable of being vatted and therefore vat colors but having no affinity or substantially no affinity for fibre and therefore not dyestuffs insofar as the textile industry is concerned but capable of dyeing or coloring cement so that the specification is not limited to coloring matters suitable for the dyeing of materials of animal or vegetable origin.

Anthraquinone vat colors having as a general property good fastness to light are preferred for use according to the present invention.

It is preferable to select such coloring matters as when precipitated are insoluble so as to prevent the same as far as possible being washed out of the building material on exposure to the weather. It has been found that generally speaking satisfactory results can be obtained by employing a solution containing from 0.1 to 0.7 per cent. by weight of the coloring material calculated on the quantity of dry building material employed. It is also preferable to use colors fast to light.

It is also preferred that the dyestuffs shall be capable of becoming fixed on the cement or other building material although as has been indicated other coloring matters may be used.

The invention may be applied to a suitable carrier for the purpose of coloring the same after which the dried colored carrier is added to the general body of the building material.

In this manner, various artistic effects such as imitation marble effects may be obtained.

Different effects can be achieved by separately coloring batches of building material with different colors and then utilizing these in any desired arrangement to produce multicolored effects.

Where the process is applied to the dry or powdered building material the resultant structure or article will generally be found to be uniformly colored throughout but where the invention is applied to the finished article such as by impregnation or external application, it will generally be found that the colored effect is more or less superficial according to the nature and the thoroughness of the impregnation or like process, and in the latter event it may be found that the color on the outside surface will be darker due to the greater oxidation than that of the layers of material immediately beneath the surface. This, however, may be an advantage, as in the event of wear, chipping, or the like of the article the freshly exposed surface will rapidly assume the normal color as a result of oxidation.

Having now described my invention what I claim as new and desire to secure by Letters Patent is:—

1. A method for the production of colored effects in building materials, which comprises the incorporation with the building material of an anthraquinone vat dyestuff.

2. The process which consists in the incorporation of an anthraquinone vat dyestuff water wet paste with a water wet cement aggregate.

3. The process of coloring building cementitious material with an anthraquinone vat dyestuff, which consists in mixing about 5 pounds of said dyestuff with from 2 to 2½ gallons of water having therein 5 percent of caustic soda, adding to the mixture sodium hydro-sulphite in small quantities until a clear solution is obtained and using the solution as the gauging water for a standard cement and sand mixture containing about 100 pounds of Portland cement.

In testimony whereof I have signed my name to this specification.

GERALD NOEL WHITE.